United States Patent
Kim

(10) Patent No.: US 11,654,865 B2
(45) Date of Patent: May 23, 2023

(54) DEVICE AND METHOD FOR CONTROLLING WIPER OF VEHICLE

(71) Applicants: HYUNDAI MOTOR COMPANY, Seoul (KR); KIA MOTORS CORPORATION, Seoul (KR)

(72) Inventor: Kyoung Jun Kim, Ulsan (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 307 days.

(21) Appl. No.: 17/018,207

(22) Filed: Sep. 11, 2020

(65) Prior Publication Data
US 2021/0387595 A1    Dec. 16, 2021

(30) Foreign Application Priority Data
Jun. 16, 2020    (KR) .................. 10-2020-0073110

(51) Int. Cl.
  *B60S 1/08*  (2006.01)
  *G01P 3/44*  (2006.01)
  *B60Q 9/00*  (2006.01)

(52) U.S. Cl.
  CPC .............. *B60S 1/0862* (2013.01); *B60Q 9/00* (2013.01); *B60S 1/0896* (2013.01); *G01P 3/44* (2013.01)

(58) Field of Classification Search
  CPC ........ B60S 1/3413; B60S 1/08; B60S 1/0896; B60S 1/0862; Y10S 318/02; G01P 3/44; B60Q 9/00; H02P 1/22
  USPC .............................................. 701/49; 388/854
  See application file for complete search history.

(56) References Cited

U.S. PATENT DOCUMENTS

| 2013/0251352 A1* | 9/2013 | Natsume ................... H02P 1/22 388/854 |
| 2014/0142814 A1* | 5/2014 | Nakano ..................... B60S 1/08 701/49 |
| 2016/0121855 A1* | 5/2016 | Doorley .................. B60S 1/566 15/250.01 |

\* cited by examiner

*Primary Examiner* — Katina N. Henson
(74) *Attorney, Agent, or Firm* — Morgan, Lewis & Bockius LLP

(57) ABSTRACT

A device and a method for controlling a wiper of a vehicle. The device may include a wiper actuator for driving the wiper of the vehicle, a sensor for measuring a driving speed of the wiper, and a controller that controls the wiper of the vehicle based on a relationship between a driving voltage applied to the wiper actuator and the driving speed measured by the sensor.

10 Claims, 6 Drawing Sheets

DEVICE AND METHOD FOR CONTROLLING WIPER OF VEHICLE

CROSS-REFERENCE TO RELATED APPLICATION

The present application claims the benefit of priority to Korean Patent Application No. 10-2020-0073110, filed on Jun. 16, 2020 in the Korean Intellectual Property Office, the entire disclosure of which is incorporated herein by reference.

TECHNICAL FIELD

The present disclosure relates to a technology for sensing and controlling an abnormal operation of a wiper disposed on a vehicle.

BACKGROUND

In general, a vehicle is equipped with a wiper that removes foreign substances located on a surface of a windshield glass and wipes snow or rain.

Such wiper of the vehicle is an apparatus for the wiping glass through a wiper blade operated by rotation of a wiper motor, which performs a function of securing a view of a driver. That is, the wiper of the vehicle has a structure in which a rotational motion generated by the wiper motor is transmitted to a pivot mechanism and a wiper arm through a wiper link, which causes the wiper arm to reciprocate in a left and right direction, so that the wiper blade wipes the foreign substances on the glass surface while moving on the glass surface. In this connection, an operation of the wiper motor is controlled by, for example, a body control module (BCM) in the vehicle.

An operating mode of the wiper is largely classified into a low mode, a high mode, and the like, and terminals of the wiper motor controlled by the BCM is composed of a total of four terminals. Among such terminals of the wiper motor, an E terminal is a ground (−) terminal, a P terminal is a parking control terminal, a H terminal is a high mode terminal, and a L terminal is a low mode terminal. In addition, the wiper motor has a cam plate and an internal contact point formed by the P terminal and the E terminal controlled by the cam plate. In this connection, the cam plate is installed to rotate in a state of being integrated with a worm gear (a worm wheel) that rotates by receiving a rotational force of the motor within the wiper motor, and brings the P terminal of the internal contact point into contact with the E terminal once based on a location of the wiper blade during one rotation.

In such wiper, the wiper blade wipes the glass by reciprocating once by driving of the wiper motor during the one rotation of the cam plate. At this time, the P terminal and the E terminal of the wiper motor are brought into contact with each other by the cam plate, so that the wiper blade stops at a preset parking location. In addition, when a user does not turn off the wiper through a multi-function switch, the BCM does not turn off a low relay even when the P terminal and the E terminal of the wiper motor are in contact with each other. Accordingly, the cam plate is rotated and moved by an inertia of the wiper motor in the state in which the P terminal and the E terminal are in contact with each other. Thus, the P terminal and the E terminal are separated from each other, and the wiper motor is driven by battery power again to operate the wiper blade. Through repetition of such process, the wiper blade continuously wipes the glass.

Recently, it often occurs that the driver operates the wiper without contacting the wiper blade to the windshield glass of the vehicle in a process of replacing the wiper blade of the vehicle or cleaning the wiper blade.

In this case, the wiper blade hits a hood of the vehicle and damages the wiper blade as well as the hood.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides a device and a method for controlling a wiper of a vehicle that may detect whether a wiper blade is in close contact with a surface of a windshield glass based on a relationship between a wiper driving voltage and a wiper driving speed for each surface condition of the windshield glass of the vehicle, and control driving of the wiper based on the detection result, thereby preventing the wiper blade from being driven in a state of not being in close contact with the surface of the windshield glass and damaging a hood of the vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling a wiper of a vehicle includes a wiper actuator for driving the wiper of the vehicle, a sensor for measuring a driving speed of the wiper, and a controller that controls the wiper of the vehicle based on a relationship between a driving voltage applied to the wiper actuator and the driving speed measured by the sensor.

In one embodiment, the controller may determine a threshold speed value corresponding to the driving voltage, and determine that a wiper blade of the wiper is not in close contact with a windshield glass of the vehicle when the driving speed exceeds the threshold speed value.

In one embodiment, the controller may stop the driving of the wiper through the wiper actuator when the controller determines that the wiper blade is not in close contact with the windshield glass of the vehicle.

In one embodiment, the controller may warn a user when the controller determines that the wiper blade is not in close contact with the windshield glass of the vehicle.

In one embodiment, the controller may warn in at least one scheme of a visual warning, an audible warning, or a tactile warning.

In one embodiment, the controller may determine that a wiper blade of the wiper is not in close contact with a windshield glass of the vehicle when a ratio of the driving speed to the driving voltage exceeds a threshold ratio value.

In one embodiment, the device may further include storage for storing at least one of a graph showing a relationship between the driving voltage and the wiper driving speed when a surface of a windshield glass is in a dirty condition, a graph showing a relationship between the driving voltage and the driving speed when the surface of the windshield glass is in a dry condition, a graph showing a relationship between the driving voltage and the wiper driving speed when the surface of the windshield glass is in a normal condition, a graph showing a relationship between the driving voltage and the wiper driving speed when the surface of the windshield glass is in a wet condition, or a graph showing a relationship between the driving voltage and the wiper driving speed when a wiper blade is not in close contact with the surface of the windshield glass.

In one embodiment, the device may further include storage for storing at least one of a graph showing a ratio of the wiper driving speed to the driving voltage when a surface of a windshield glass of the vehicle is in a dirty condition, a graph showing a ratio of the wiper driving speed to the driving voltage when the surface of the windshield glass of the vehicle is in a dry condition, a graph showing a ratio of the wiper driving speed to the driving voltage when the surface of the windshield glass of the vehicle is in a normal condition, a graph showing a ratio of the wiper driving speed to the driving voltage when the surface of the windshield glass of the vehicle is in a wet condition, or a graph showing a ratio of the wiper driving speed to the driving voltage when a wiper blade is not in close contact with the surface of the windshield glass of the vehicle.

According to another aspect of the present disclosure, a method for controlling a wiper of a vehicle includes detecting, by a controller, a driving voltage applied to a wiper actuator, measuring, by a sensor, a driving speed corresponding to the driving voltage, and controlling, by the controller, the wiper of the vehicle based on a relationship between the applied driving voltage and the measured driving speed.

In one embodiment, the controlling of the wiper of the vehicle may include detecting a threshold speed value corresponding to the driving voltage, and determining that a wiper blade is not in close contact with a windshield glass of the vehicle when the driving speed exceeds the threshold speed value.

In one embodiment, the controlling of the wiper of the vehicle may further include stopping driving of the wiper when the wiper blade is not in close contact with the windshield glass of the vehicle.

In one embodiment, the controlling of the wiper of the vehicle may further include warning a user in at least one scheme of a visual warning, an audible warning, or a tactile warning when the wiper blade is not in close contact with the windshield glass of the vehicle.

In one embodiment, the controlling of the wiper of the vehicle may include determining that a wiper blade is not in close contact with a windshield glass of the vehicle when a ratio of the driving speed to the driving voltage exceeds a threshold ratio value.

According to another aspect of the present disclosure, a method for controlling a wiper of a vehicle includes storing, in a storage, a graph showing a threshold speed value used to determine whether a wiper blade is in close contact with a surface of a windshield glass of the vehicle, detecting, by a controller, a driving voltage applied to a wiper actuator, measuring, by a sensor, a driving speed corresponding to the driving voltage, determining, by the controller, the threshold speed value corresponding to the driving voltage based on the graph, and determining, by the controller, that the wiper blade is not in close contact with the windshield glass of the vehicle when the driving speed exceeds the threshold speed value to stop driving of the wiper.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
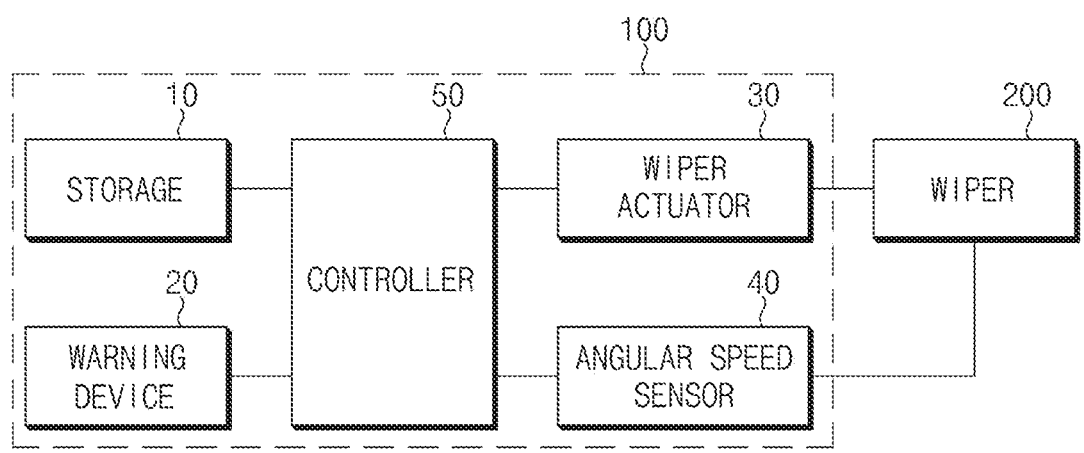
FIG. 1 is a configuration diagram of a device for controlling a wiper of a vehicle according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a configuration diagram of a device for controlling a wiper 200 of a vehicle according to an exemplary embodiment of the present disclosure.

As shown in FIG. 1, a wiper control device 100 of a vehicle according to an exemplary embodiment of the present disclosure may include a storage 10, a warning device 20, a wiper actuator 30, an angular speed sensor 40, and a controller 50. In this embodiment, components may be coupled to each other to be implemented as one component or some components may be omitted based on a scheme of implementing the wiper control device 100 of the vehicle according to an exemplary embodiment of the present disclosure.

In a description of each component, first, the storage 10 may store various logics, algorithms, and programs required in a process of detecting whether a wiper blade is in close contact with a surface of a windshield glass based on a relationship between a wiper driving voltage and a wiper driving speed for each surface condition of the windshield glass, and controlling driving of the wiper 200 based on the detection result. In this embodiment, the wiper driving voltage means a voltage applied to the wiper actuator 30.

The storage 10 may store a table in which the relationship between the wiper driving voltage and the wiper driving speed of the vehicle is recorded for each surface condition of the windshield glass. Such table is, for example, as shown in FIGS. 2 and 3.

Figure 2:
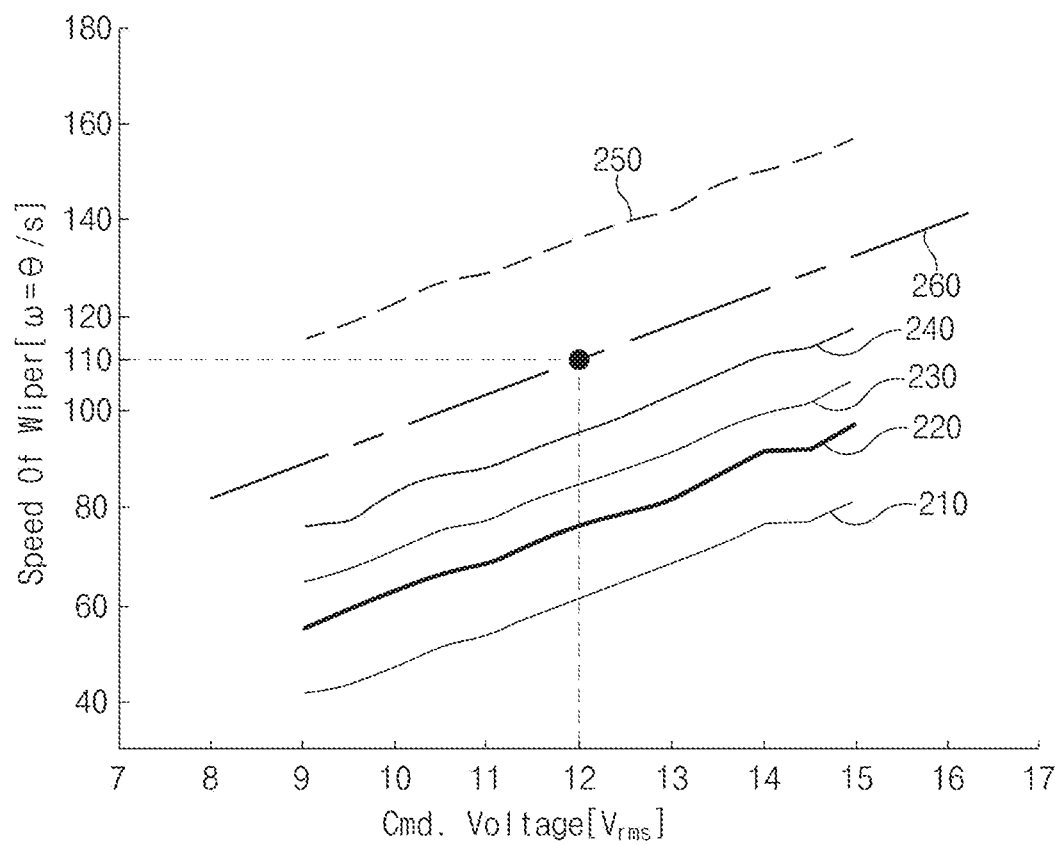
FIG. 2 is an exemplary view of a table provided in a device for controlling a wiper of a vehicle according to an exemplary embodiment of the present disclosure.
Figure 3:
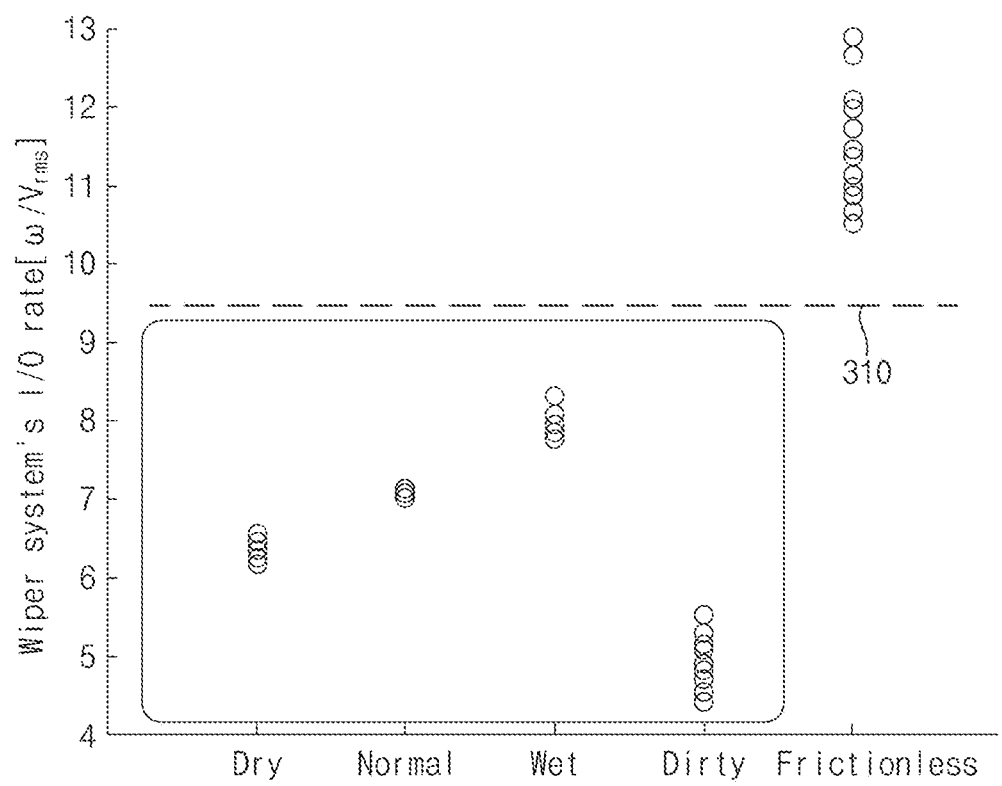
FIG. 3 is another exemplary view of a table provided in a device for controlling a wiper of a vehicle according to an exemplary embodiment of the present disclosure.

FIG. 2 is an exemplary view of a table provided in a device for controlling a wiper 200 of a vehicle according to an exemplary embodiment of the present disclosure.

In FIG. 2, a horizontal axis represents an effective voltage (Vrms) as the wiper driving voltage, and a vertical axis represents an angular speed ($\omega=\theta/s$) as the wiper driving speed.

In addition, '210' is a graph showing a relationship between the wiper driving voltage and the wiper driving speed when the surface of the windshield glass is in a dirty condition, '220' is a graph showing a relationship between the wiper driving voltage and the wiper driving speed when the surface of the windshield glass is in a dry condition, '230' is a graph showing a relationship between the wiper driving voltage and the wiper driving speed when the surface of the windshield glass is in a normal condition, '240' is a graph showing a relationship between the wiper driving voltage and the wiper driving speed when the surface of the windshield glass is in a wet condition, '250' is a graph showing a relationship between the wiper driving voltage and the wiper driving speed when the wiper blade is not in close contact with the surface of the windshield glass, and '260' is a graph showing a threshold speed value of the wiper driving speed at each different wiper driving voltage, which is used to determine whether the wiper blade is in close contact with the surface of the windshield glass. In this embodiment, the threshold speed value may be predetermined via, e.g., a deep learning process using an artificial neural network.

For example, when 12 V is applied to the wiper actuator 30, that is, when the wiper driving voltage is 12 V, the controller 50 may determine that the threshold speed value corresponding to the wiper driving voltage of 12 V is 110 $\theta/s$. The controller 50 may determine that the wiper blade is not in close contact with the surface of the windshield glass when the wiper driving speed exceeds 110 $\theta/s$ (which is a threshold speed value of the wiper 200 at 12 V), and may determine that the wiper blade is in contact with the surface of the windshield glass when the wiper driving speed does not exceed 110 $\theta/s$.

As another example, when 12 V is applied to the wiper actuator 30, that is, when the wiper driving voltage is 12 V, the controller 50 may determine that the surface of the windshield glass is in the dirty condition when the wiper driving speed is within a range from 60 to 64 $\theta/s$, may determine that the surface of the windshield glass is in the dry condition when the wiper driving speed is within a range from 74 to 78 $\theta/s$, may determine that the surface of the windshield glass is in the normal condition when the wiper driving speed is within a range from 81 to 85 $\theta/s$, and may determine that the surface of the windshield glass is in the wet condition when the wiper driving speed is in a range from 94 to 98 $\theta/s$.

FIG. 3 is another exemplary view of a table provided in a device for controlling a wiper of a vehicle according to an exemplary embodiment of the present disclosure.

In FIG. 3, a horizontal axis represents the surface condition of the windshield glass, and a vertical axis represents a ratio ($\omega$/Vrms) of an output (the driving speed) of a wiper system (the wiper actuator 30 and a wiper 200) to an input (the driving voltage). In addition, '310' represents a threshold value for the ratio of the wiper driving speed ($\omega$) to the wiper driving voltage (Vrms). In this embodiment, the threshold ratio value may be predetermined via the deep learning process using the artificial neural network.

For example, the controller 50 may determine that the wiper blade is not in close contact with the surface of the windshield glass when the ratio of the wiper driving speed ($\omega$) to the wiper driving voltage (Vrms) exceeds 9.5 (e.g., a predetermined threshold ratio value), and may determine that the wiper blade is in close contact with the surface of the windshield glass when the ratio of the wiper driving speed ($\omega$) to the wiper driving voltage (Vrms) does not exceed 9.5.

In another example, the controller 50 may determine that the surface of the windshield glass is in the dirty condition when the ratio of the wiper driving speed ($\omega$) to the wiper driving voltage (Vrms) is equal to or below 5.8, may determine that the surface of the windshield glass is in the dry condition when the ratio of the wiper driving speed ($\omega$) to the wiper driving voltage (Vrms) is above 5.8 and equal to or below 6.9, may determine that the surface of the windshield glass is in the normal condition when the ratio of the wiper driving speed ($\omega$) to the wiper driving voltage (Vrms) is above 6.9 and equal to or below 7.5, and may determine that the surface of the windshield glass is in the wet condition when the ratio of the wiper driving speed ($\omega$) to the wiper driving voltage (Vrms) is above 7.5 and equal to or below 8.5.

Although the table of FIG. 2 and the table of FIG. 3 described above described the examples of using the driving voltage, but the table of FIG. 2 and the table of FIG. 3 may be implemented using a driving current.

The storage 10 may include a non-transitory storage medium of at least one type of memory such as a flash memory type, a hard disk type, a micro type, and a card type (for example, a secure digital card (SD card) or an extream digital card (XD card)), and the like, and memory such as a random access memory (RAM), a static RAM (SRAM), a read only memory (ROM), a programmable ROM (PROM), an electrically erasable PROM (EEPROM), a magnetic RAM (MRAM), a magnetic disk, and an optical disk.

The warning device 20 may warn a user that a hood of the vehicle may be damaged under control of the controller 50.

The warning device 20 may warn that the hood of the vehicle may be damaged in at least one scheme of a visual warning, an audible warning, or a tactile warning. As an example, the warning device 20 may warn in a visual or/and audible manner and may include a cluster, a head up display (HUD), an audio video navigation (AVN) system, and the like that the hood of the vehicle may be damaged, and may warn in a tactile manner through a vibrating seat, vibrating steering, and the like that the hood of the vehicle may be damaged.

The wiper actuator 30, which is a motor (e.g., a H-bridge motor) that drives the wiper 200, may drive the wiper 200 based on the driving voltage (or the driving current) applied under control of the controller 50.

The angular speed sensor 40, which is a sensor (e.g., an arm position sensor) that measures a driving speed of an arm of the wiper 200, may measure an angular speed (or a location) of the arm of the wiper 200.

The controller 50 performs overall control such that each of the components may normally perform a function thereof. Such controller 50 may be implemented in a form of hardware or software, or in a form of a combination of the hardware and the software. In one exemplary embodiment, the controller 50 may be a processor (e.g., microprocessor, computer, CPU, ASIC, circuitry, logic circuits, etc.), but may not be limited thereto. The controller 50 may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

Such controller 50 may perform various controls in the process of detecting whether the wiper blade is in close contact with the surface of the windshield glass based on the relationship between the wiper driving voltage and the wiper driving speed for each surface condition of the windshield glass and controlling the driving of the wiper based on the detection result.

Figure 4:
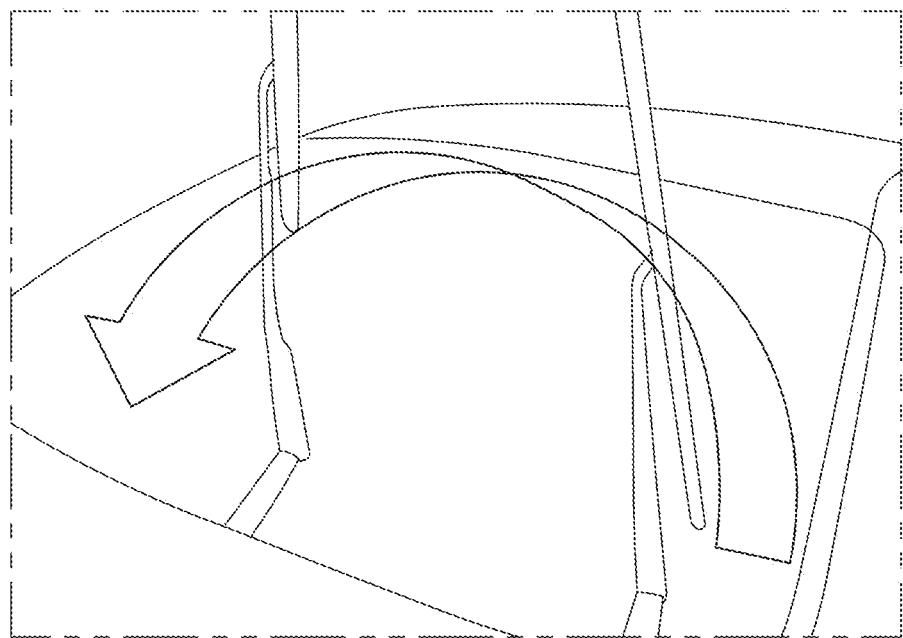
FIG. 4 is an exemplary view of a structure of a wiper used in an exemplary embodiment of the present disclosure.

As shown in FIG. 4, the controller 50 may determine the state in which the wiper blade is not in close contact with the surface of the windshield glass of the vehicle.

FIG. 4 is an exemplary view of a structure of a wiper used in an exemplary embodiment of the present disclosure.

As shown in FIG. 4, in a process of replacing the wiper blade of the vehicle or cleaning the wiper blade, the driver may locate the arm of the wiper 200 at a service position, and separate the wiper blade from the surface of the windshield glass. When the wiper 200 is driven in such a condition, the wiper blade may hit the hood of the vehicle and may damage the hood of the vehicle.

The controller 50 may detect whether the wiper blade is in close contact with the surface of the windshield glass of the vehicle based on the relationship between the driving voltage of the wiper 200 and the driving speed of the wiper 200. That is, the controller 50 may detect whether the wiper blade is in close contact with the surface of the windshield glass of the vehicle based on the table stored in the storage.

As an example, the controller 50 may detect the driving speed corresponding to the driving voltage (the wiper driving voltage) applied to the wiper actuator 30, determine the threshold value corresponding to the driving voltage based on the table as shown in FIG. 2, and determine that the wiper blade is not in close contact with the surface of the windshield glass when the detected driving speed exceeds the driving speed corresponding to the threshold value. In this embodiment, the threshold value is a value that varies based on the driving voltage.

As another example, the controller 50 may detect the driving speed corresponding to the driving voltage (the wiper driving voltage) applied to the wiper actuator 30, and determine that the wiper blade is not in contact with the surface of the windshield glass based on the table as shown in FIG. 3 when the ratio ($\omega$/Vrms) of the driving speed ($\omega$) to the wiper driving voltage (Vrms) exceeds the threshold value. In this embodiment, the threshold value is a fixed value.

The controller 50 may stop the driving of the wiper 200 through the wiper actuator 30 when the wiper blade is not in close contact with the surface of the windshield glass.

The controller 50 may warn the user through the warning device 20 when the wiper blade is not in close contact with the surface of the windshield glass.

In another exemplary embodiment, the controller 50 may determine whether the wiper blade is in close contact with the surface of the windshield glass based on a wiper driving speed corresponding to a wiper driving voltage at a previous time point (which may be, e.g., immediately previous time point at which the wiper 200 was driven, with respect to a current time point).

As an example, when the wiper driving voltage is 12 V and the wiper driving speed is 98 at the previous time point, the threshold value at the driving voltage of 12 V may be set to 100.

As another example, when a ratio of the wiper driving speed to the wiper driving voltage at the previous time point is 9.2, the threshold value may be set to 9.5.

Figure 5:
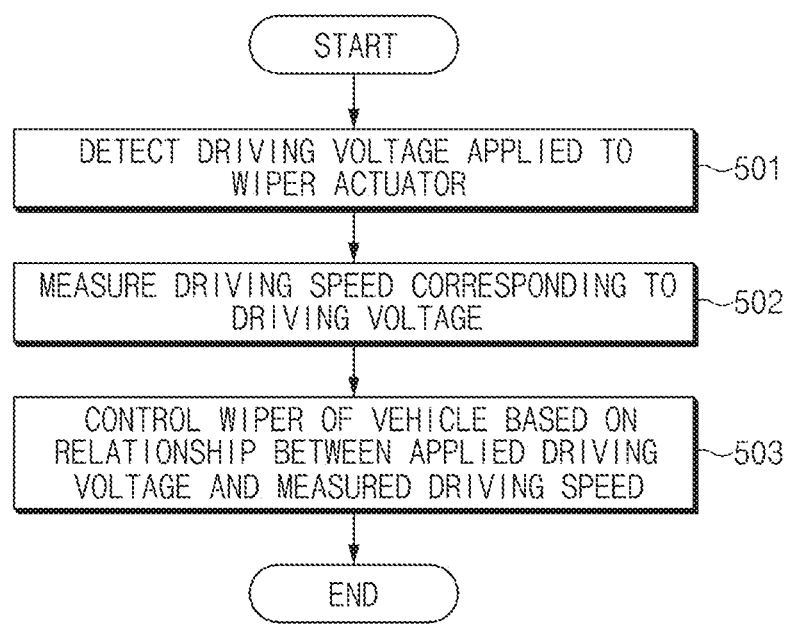
FIG. 5 is a flowchart of a method for controlling a wiper of a vehicle according to an exemplary embodiment of the present disclosure.

FIG. 5 is a flowchart of a method for controlling a wiper of a vehicle according to an exemplary embodiment of the present disclosure.

First, the controller 50 detects the driving voltage applied to the wiper actuator 30 (501).

Further, the angular speed sensor 40 measures the driving speed corresponding to the driving voltage (502).

Thereafter, the controller 50 controls the wiper of the vehicle based on the relationship between the applied driving voltage and the measured driving speed (503).

Figure 6:
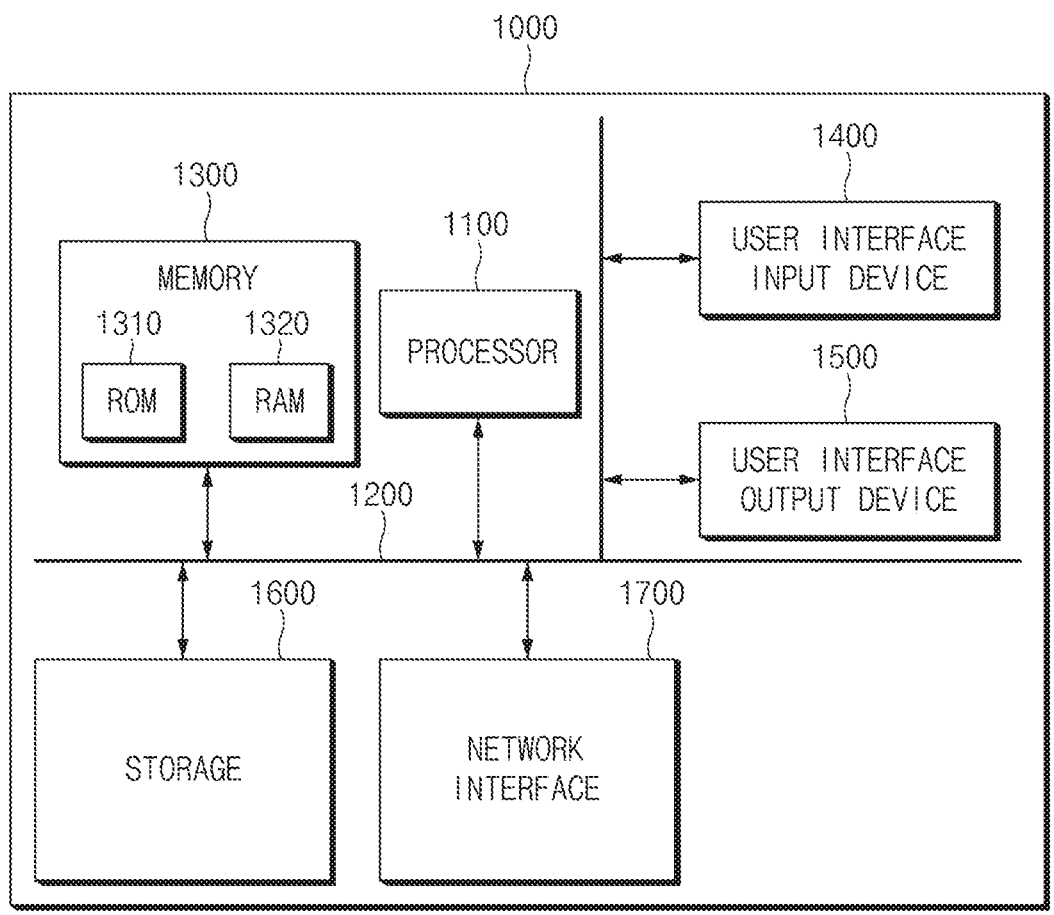
FIG. 6 is a block diagram illustrating a computing system for executing a method for controlling a wiper of a vehicle according to an exemplary embodiment of the present disclosure.

FIG. 6 is a block diagram illustrating a computing system for executing a method for controlling a wiper of a vehicle according to an exemplary embodiment of the present disclosure.

Referring to FIG. 6, the method for controlling the wiper of the vehicle according to an exemplary embodiment of the present disclosure described above may also be implemented through a computing system. A computing system 1000 may include at least one processor 1100, a non-transitory memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random. Access Memory).

Thus, the operations of the method or the algorithm described in connection with the embodiments disclosed herein may be embodied directly in a hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for controlling the wiper of the vehicle according to an embodiment of the present disclosure may detect whether the wiper blade is in close contact with the surface of the windshield glass based on the relationship between the wiper driving voltage and the wiper driving speed for each surface condition of the windshield glass of the vehicle, and control the driving of the wiper based on the detection result, thereby preventing the wiper blade from being driven in the state of not being in close contact with the surface of the windshield glass and damaging the hood of the vehicle.

Hereinabove, although the present disclosure has been described with reference to exemplary embodiments and the accompanying drawings, the present disclosure is not limited thereto, but may be various modified and altered by those skilled in the art to which the present disclosure pertains without departing from the spirit and scope of the present disclosure claimed in the following claims.

What is claimed is:

1. A device for controlling a wiper of a vehicle, the device comprising:
    a wiper actuator for driving the wiper of the vehicle;
    a sensor for measuring a driving speed of the wiper; and
    a controller configured to determine whether the wiper is in close contact with a windshield glass of the vehicle based on a relationship between a driving voltage applied to the wiper actuator and the driving speed measured by the sensor,
    wherein the controller is further configured to:
        determine a threshold speed value corresponding to the driving voltage, and
        determine that a wiper blade of the wiper is not in close contact with the windshield glass of the vehicle when the driving speed exceeds the threshold speed value.

2. The device of claim 1, wherein the controller is further configured to stop the driving of the wiper through the wiper actuator when the controller determines that the wiper blade is not in close contact with the windshield glass of the vehicle.

3. The device of claim 1, wherein the controller is further configured to warn a user when the controller determines that the wiper blade is not in close contact with the windshield glass of the vehicle.

4. The device of claim 3, wherein the controller is further configured to warn in at least one scheme of a visual warning, an audible warning, or a tactile warning.

5. A device for controlling a wiper of a vehicle, the device comprising:
    a wiper actuator for driving the wiper of the vehicle;
    a sensor for measuring a driving speed of the wiper; and
    a controller configured to determine whether the wiper is in close contact with a windshield glass of the vehicle based on a relationship between a driving voltage applied to the wiper actuator and the driving speed measured by the sensor,
    wherein the controller is further configured to determine that a wiper blade of the wiper is not in close contact with the windshield glass of the vehicle when a ratio of the driving speed to the driving voltage exceeds a threshold ratio value.

6. The device of claim 5, wherein the controller is further configured to stop the driving of the wiper through the wiper actuator when the controller determines that the wiper blade is not in close contact with the windshield glass of the vehicle.

7. The device of claim 5, wherein the controller is further configured to warn a user when the controller determines that the wiper blade is not in close contact with the windshield glass of the vehicle.

8. The device of claim 7, wherein the controller is further configured to warn in at least one scheme of a visual warning, an audible warning, or a tactile warning.

9. A method for controlling a wiper of a vehicle, the method comprising:
    storing, in a storage, a graph showing a threshold speed value used to determine whether a wiper blade of the wiper is in close contact with a surface of a windshield glass of the vehicle;
    detecting, by a controller, a driving voltage applied to a wiper actuator;
    measuring, by a sensor, a driving speed corresponding to the driving voltage;
    determining, by the controller, the threshold speed value corresponding to the driving voltage based on the graph; and
    determining, by the controller, that the wiper blade is not in close contact with the windshield glass of the vehicle when the driving speed exceeds the threshold speed value to stop driving of the wiper.

10. The method of claim 9, further comprising,
    determining, by the controller, that the wiper blade is not in close contact with the windshield glass of the vehicle when a ratio of the driving speed to the driving voltage exceeds a threshold ratio value.

* * * * *